United States Patent Office 3,251,753
Patented May 17, 1966

3,251,753
PROCESS FOR THE PURIFICATION OF CYCLOHEXANONE
Karl-Heinz Mueller, Ludwigshafen (Rhine), and Otto Goehre, Heidelberg,, Germany, assignors to Badische Anilin- & Soda-Fabrik Aktiengesellschaft, Ludwigshafen (Rhine), Germany
No Drawing. Filed Nov. 27, 1962, Ser. No. 240,448
Claims priority, application Germany, Nov. 28, 1961,
B 64,955
2 Claims. (Cl. 203—38)

This invention relates to a process for the purification of cyclohexanone to be used for the production of polymers and resins. More specifically, the invention relates to a process for the purification of cyclohexanone produced by catalytic dehydrogenation of cyclohexanol.

It is known that monomeric caprolactam can be prepared from cyclohexanone by first producing cyclohexanone oxime and then rearranging the oxime to caprolactam. For the production of poly caprolactam, high-purity cyclohexanone is required if polycaprolactam with satisfactory color properties is to be obtained. It has been found that cyclohexanone obtained by dehydrogenation of cyclohexanol contains small amounts of unsaturated ketones which cause the cyclohexanone to discolor and turn yellow during storage. Furthermore, these unsaturated ketones cause undesirably low permanganate numbers.

The term "permanganate number," as used herein, indicates the number of seconds required by 10 cc. of product cooled to 0° C. to decolorize upon mixing with 3 drops of a 1% aqueous $KMnO_4$ solution.

Similarly, for the production of ketone resins from cyclohexanone or alkyl-substituted cyclohexanones by self-condensation, an initial material of high purity is required if clear, colorless resins are to be obtained. For the above reasons, it is necessary to remove the unsaturated ketones from the crude cyclohexanone. Removal by distillation is not possible because the boiling points of the unsaturated ketones and the desired cyclohexanones are very close together.

The terms "cyclohexanones" and "cyclohexanol," as used herein, include cyclohexanones and cyclohexanols which are substituted with one or two alkyls with from 1 to 4 carbon atoms each.

It is an object of the invention to provide a process for the purification of crude cyclohexanone which has been obtained by dehydrogenation of cyclohexanol and contains unsaturated ketones as impurities. It is another object of the invention to produce cyclohexanone having a high permanganate number. It is a further object of the invention to provide a process for the production of cyclohexanone which is substantially free from unsaturated ketones. Still another object of the invention is to provide a process for the purification of cyclohexanone which yields cyclohexanone suitable for conversion into caprolactam from which polycaprolactam of satisfactory color can be obtained. Yet another object of the invention is to provide pure cyclohexanone which is suitable for the production of clear, colorless ketone resins.

These and other objects of the invention are achieved by adding to the crude cyclohexanone to be purified an alkali compound in an amount of about 0.01 to 1.0% by weight with reference to the crude cyclohexanone and distilling the cyclohexanone in the presence of the alkali compound. Surprisingly, this procedure is effective in removing the unsaturated impurities even though unsaturated ketones are known to undergo condensation at elevated temperatures and in the presence of alkaline compounds.

Crude cyclohexanone obtained by catalytic dehydrogenation of cyclohexanol is essential a mixture of cyclohexanone, unreacted cyclohexanol and impurities formed as byproducts during dehydrogenation. Obviously, impurities may also be contained in the initial cyclohexanol prior to dehydrogenation. The present invention is concerned with the removal of unsaturated ketones formed during dehydrogenation, although other impurities can also be removed as disclosed in greater detail hereinafter. Cyclohexenone is the most troublesome impurity to be removed according to the invention. Other impurities include 2-cyclohexenone, 2,4-cyclohexadienone, 2-cyclohexanol and 2,4-cyclohexadienol.

In general, the composition of the initial crude cyclohexanone and methylcyclohexanone, after removal of water but before removal of the cyclohexanol or methylcyclohexanol, is as follows:

|  | Percent by weight |
|---|---|
| Cyclohexanone | 75–85 |
| Cyclohexanol | 20–30 |
| Unsaturated cyclic ketones and alcohols | 0.25–0.6 |
| High-boiling residues | 2.5–4.0 |
| Hydrocarbons | 0.2–1.0 |

Alkali compounds which are useful for the process of this invention include alkali metal hydroxides, alkali metal carbonates, alkali metal alcoholates with 1 to 4 carbon atoms, alkali metal phenolates and naphtholates, alkaline earth metal hydroxides, alkaline earth metal alcoholates with from 1 to 4 carbon atoms and alkaline earth metal phenolates and naphtholates, the alkaline earth metal in each case having an atomic weight of at least 40.

The alcoholates can be designated by the formula MeOR, where R is alkyl with 1 to 4 carbon atoms and Me is the alkali metal or alkaline earth metal.

Specific examples of alkali compounds are: lithium hydroxide, sodium hydroxide, potassium hydroxide, lithium carbonate, sodium carbonate, potassium carbonate, lithium methylate, potassium methylate, sodium methylate, potassium ethylate, sodium methylate, sodium propylate, sodium isopropylate, potassium propylate, sodium n-butylate, potassium n-butylate, sodium 2-butylate, sodium tert.-butylate, sodium isobutylate, sodium phenolate, lithium phenolate, sodium cresolates, sodium naptholates, potassium phenolate, potassium cresolates, potassium naphtholates, calcium hydroxide, barium hydroxide, strontium hydroxide, calcium methylate, calcium ethylate and barium ethylate. Compounds which readily form hydroxides with moisture, i.e., with a small amount of water, are also suitable for preparation of the alkali compound in situ. Such compounds include the oxides, hydrides and carbides of alkali and alkaline earth metals.

The crude cyclohexanones are obtained by dehydrogenation of the corresponding cyclohexanols. The known dehydrogenation reaction is carried out, for example, by passing the cyclohexanol at a temperature of 250 to 400° C. over a dehydrogenation catalyst. Cyclohexanols of different origin may be used, e.g., cyclohexanols obtained by hydrogenation of the corresponding phenols such as phenol itself or the various cresols or xylenols. The cyclohexanol may also be obtained by hydrogenation and hydrolysis of aniline, toluidines, xylidines or the corresponding nitrobenzene compounds. Also cyclohexanol obtained by air oxidation of cyclohexane can be used for this purpose.

All conventional dehydrogenation catalysts can be used for converting the cyclohexanol into crude cyclohexanone. Such dehydrogenation catalysts include, for example, the heavy metals of Groups I, II, II and VIII of the Periodic System. These metals can also be used in the form of their oxides or phosphates. Typical examples of such catalysts are: metals such as copper, silver, gold, nickel, tin, platinum and brass; oxides such zinc oxide, chromium oxide, manganese oxide, iron oxide, cobalt oxide and nickel oxide; and alkaline earth metal phosphates. The catalysts are advantageously applied to inert carriers, such as alumina, titanium dioxide, magnesium oxide, silicic acid, silicates of zinc, aluminum, magnesium and the like. Also mixtures of the carriers mentioned may be employed. The carrier may or may not be pretreated with halogen (chlorine, bromine, fluorine or iodine), hydrogen halides such as hydrogen fluoride and hydrogen chloride, or hydrogen.

The dehydrogenation of the cyclohexanol may be carried out in a single-stage or multi-stage process. In all known dehydrogenation processes, the same troublesome impurities, i.e., unsaturated ketones, are formed as byproducts. Such byproducts are removed effectively by the process of the present invention.

As a rule, the alkali compound is supplied to the distillation mixture in an amount of 0.01 to 1.0% by weight with reference to the crude cyclohexanone to be purified. The use of larger amounts is possible, but tends to substantially reduce the yield of pure cyclohexanone as a result of undesirable condensation reactions. The alkali compound can be dispersed in the crude cyclohexanone before or after separation of other impurities, and in this respect the cyclohexanone is considered to be a crude or impure material as long as it contains the unsaturated ketones and alcohols as impurities. Obviously, mixtures of various alkali compounds may also be used.

The distillation step for separating the pure cyclohexanone from the crude mixture in the presence of the alkali or alkaline earth metal compound may be carried out in a number of ways, the most advantageous procedure depending on the origin of the crude cyclohexanone and the nature of the byproducts or impurities. The distillation of the crude product obtained from the catalytic dehydrogenation of cyclohexanol should be carried out in at least two stages.

If any impurities have a lower boiling point than the cyclohexanone, then it is especially advantageous to distill off such low-boiling impurities in a first stage at a pressure of from 300 mm. Hg to 5 atmospheres and to subsequently distill the residue at a pressure of from 1 to 200 mm. Hg for separating the pure cyclohexanone. A procedure of this type is particularly suitable for the purification of crude cyclohexanone obtained by catalytic dehydrogenation of cyclohexanol produced from cyclohexane by air oxidation. It is not critical at what pressure above 300 mm. Hg the first distillation step is carried out, but pressures higher than 5 atmospheres would require more complicated equipment and precautions without offering any advantage. The preferred pressure range for the first distillation step is between about 300 and 1000 mm. Hg. In the second stage, the preferred pressure range is about 10 to 100 mm. Hg. The temperature in the second stage is preferably in the range where only cyclohexanone distills off and a residue consisting essentially of cyclohexanol remains. For instance, at a pressure of 50 mm. Hg the temperature range for the second distillation step is preferably from 105 to 110° C. in the bottom of the column and 72° C. at the top. By means of a third distillation step, it is possible to recover cyclohexanol from the residue of the second stage, and such cyclohexanol can be recycled to the dehydrogenation system.

Another possible distillation method is as follows: In a first step, the crude cyclohexanone obtained by dehydrogenation of cyclohexanol is distilled and fractionated, before or after addition of the alkali compound, into a higher-boiling fraction consisting essentially of cyclohexanol and a lower-boiling fraction consisting essentially of cyclohexanone. If byproducts boiling at a temperature below the boiling point of cyclohexanone are present, the lower-boiling fraction may then be separated in two distillation steps at different pressures as described hereinbefore. The alkali compound may be added prior to the first distillation step, or it may be added to the fraction consisting essentially of cyclohexanone and the cyclohexanone then distilled in the presence of the alkali compound.

The distillation or rectification can be carried out in conventional distillation columns, e.g., packed towers, bubble-cap plate towers, or sieve plate towers. General data for the size of the column to be used cannot be given, since the dimensions depend on the pressure, the reflux ratio and the composition of the product to be distilled. However, these distillation conditions can be determined by conventional methods. For example, impurities boiling lower than cyclohexanone (in the first rectification step) can be separated very effectively at a pressure of 760 mm. Hg in a bubble-cap plate column with 20 to 60 plates at a reflux ratio of 0.5:1 to 20:1, preferably in the range of 0.5:1 to 10:1. The separation of cyclohexanone and cyclohexanol is then carried out without any difficulty at a pressure of 30 to 50 mm. Hg in a bubble-cap plate column with 40 to 60 plates at a reflux ratio of 3:1 to 5:1. Isolation of the cyclohexanol from the residue of the second distillation step is carried out, for example, in a bubble-cap plate column with from 20 to 60 plates at pressure of 30 to 50 mm. Hg and a reflux ratio of 1:1 to 5:1.

It is known to dissolve alkali compounds in water and add them as aqueous alkaline solutions to cyclohexanol-cyclohexane mixtures obtained by air oxidation of cyclohexane for the purpose of washing the oxidation product and removing esters therefrom. However, this washing procedure requires separation or removal of the alkaline solution prior to recovery of the cyclohexanol. In such cases, the prior art is concerned with the removal of esters from cyclohexanol-cyclohexane oxidation mixtures, whereas the present invention is concerned with the removal of unsaturated ketones from dehydrogenation mixtures consisting essentially of cyclohexanone.

Cyclohexanones purified according to the process of this invention have very high permanganate numbers and are resistant to alkali. Also, such pure cyclohexanones lead to polycarprolactams and ketone resins of considerably improved quality.

The invention will be further illustrated by the following examples, but is not limited thereto. The parts specified are parts by weight.

*Example 1*

Methylcyclohexanol, which has been obtained by hydrogenation of cresol, is dehydrogenated at a temperature of 270 to 390° C. at a pumice-supported copper catalyst. The dehydrogenation product is condensed and separated from the hydrogen. Sodium phenolate is dispersed in the crude dehydrogenation product in an amount of 0.05% by weight and the dehydrogenation product then introduced, at a rate of 100 parts per hour, into a bubble-plate column having 20 plates. The column is operated at normal pressure. The temperature in the bottom of the column is maintained at 175° C. and the reflux ratio at 2:1. Per hour, 2 parts of a hydrocarbon fraction having a boiling range of 83 to 110° C. (760 mm. Hg) and 1 part of methylcyclohexanone are withdrawn at the top of the column, which is maintained at a temperature of 115° C. The bottoms stream from this first column, which contains also the sodium phenolate, is introduced into a second bubble-plate column having 40 plates. In this second column, rectification is continued at a pressure of 50 mm. Hg, a reflux ratio of 4:1 and a column-top temperature of 76° C. 72 parts of pure methylcyclohexanone is withdrawn per hour. The product has a permanganate number of 3,000. The stability of the product to alkali is determined by mixing in a shaking cylinder 10 cc. of product with 10 cc. of a reagent solution composed of 135 g. of pure methanol and 40 g. of sodium hydroxide, and measuring the time until the product turns yellow. When tested by this method, the purified methylcyclohexanone remains colorless for more than one hour.

The bottoms stream from the second column is passed to a third bubble-plate column having 20 plates and is rectified at a bottom temperature of 125° C., a pressure of 50 mm. Hg and a reflux ratio of 1:1. Per hour, 20 parts of methylcyclohexanol, is obtained at the top of the column, and 5 parts of residue in the bottom. The methylcyclohexanol can be recycled to the dehydrogenation system.

Similar results are achieved when using a crude dehydrogenation product which has been obtained with the aid of other dehydrogenation catalysts, e.g., zinc oxide, zinc oxide chromium oxide mixtures, chromium oxide or calcium nickel phosphate.

*Example 2*

Equal weights of aniline and steam together with hydrogen are passed, at 200° C., over a catalyst consisting of pumice as a carrier and containing 6% by weight of elemental nickel. The reaction product is condensed and separated from the accompanying gases. The liquid portion of the hydrogenation product, which consists of an aqueous ammonia solution and an oily organic phase, separates into two layers. The oily layer, consisting essentially of cyclohexanol, is heated to 300° C. together with an equal amount of steam and then passed over a dehydrogenation catalyst consisting essentially of copper on a silicic acid carrier. Through contacting with the catalyst, the cyclohexanol is dehydrogenated to cyclohexanone. The crude dehydrogenation product is condensed and separated from the aqueous layer.

The crude dehydrogenation product is then evaporated in a falling-film evaporator maintained at a temperature of 110° C. and a pressure of 100 mm. Hg. The high-boiling by-products are separated as a residue at the bottom of the evaporator. 0.03 part of sodium phenolate is added per 100 parts of distillate, and the resulting mixture is introduced into a first bubble-plate column having 20 plates. The distillation is carried out at atmospheric pressure and at a reflux ratio of 0.5:1. The temperature in the bottom of the column is maintained at 170° C. The feed rate is 100 parts per hour, and about 8 parts of water and 1 part of hydrocarbons are withdrawn per hour at the top of the column. The anhydrous bottoms are passed to a second bubble-plate column having 40 plates. This column is operated at a pressure of 50 mm. Hg, a bottom temperature of 108° C., a top temperature of 72° C. and a reflux ratio of 3.5:1. At the top of the column, there is obtained per hour 63 parts of pure cyclohexanone with a permanganate number of 9,000. When tested for its stability to alkali by the method described in Example 1, the distillate remains colorless for more than one hour.

The bottoms stream from the second column, which consists essentially of cyclohexanol, is passed to a third bubble-plate column having 20 plates. This column is operated at a pressure of 50 mm. Hg, a bottom temperature of 125° C. and a reflux ratio of 1:1. At the top of the column, 18 parts per hour of cyclohexanol is withdrawn, and 3 parts per hour of residue is removed at the bottom. The cyclohexanol can be recycled to the dehydrogenation system.

Similar results are achieved when using, instead of sodium phenolate, 0.03 part of sodium hydroxide, 0.02 part of potassium ethylate, 0.05 part of calcium methylate or 0.04 part of barium hydroxide per 100 parts of crude cyclohexanone.

If the distillation is carried out without adding an alkali compound, the cyclohexanone obtained has a permanganate number of only 480 to 600 and, when tested for its stability to alkali by the method described in Example 1, turns yellow after only 1 to 2 minutes.

The purity of cyclohexanones obtained after distillation in the presence of an alkali compound, as measured by their permanganate number and their stability in an aqueous alkaline solution, indicates that the products are substantially free of unsaturated ketones. These pure cyclohexanones can be used for the production of caprolactum polymers and ketone resins with improved properties resulting from the prior removal of the unsaturated ketones.

We claim:

1. A process for the purification of a crude cyclohexanone obtained by catalytic dehydrogenation of a cyclohexanol, which comprises dispersing in said crude cyclohexanone about 0.01 to 1.0% by weight of an alkali compound selected from the group consisting of alkali metal hydroxide, alkali metal carbonate, alkali metal alcoholate with 1 to 4 carbon atoms, alkali metal phenolate, sodium cresolates, potassium cresolates, alkali metal naphtholate, alkaline earth metal hydroxide, alkaline earth metal alcoholate with from 1 to 4 carbon atoms, alkaline earth metal phenolate, and alkaline earth metal naphtholate, in each case said alkaline earth metal having an atomic weight of at least 40, and separating a pure cyclohexanone by distilling said crude cyclohexanone in at least two stages including a first stage in which impurities having a lower boiling point than the cyclohexanone are distilled off at a pressure of about 400 mm. Hg to 5 atmospheres and a second stage in which the pure cyclohexanone is distilled off from the residue of said first stage at a pressure of about 10 to 200 mm. Hg in the presence of said alkali compound.

2. A process for the purification of a crude cyclohexanone obtained by catalytic dehydrogenation of a cyclohexanol, which comprises dispersing in said crude cyclohexanone about 0.01 to 1.0% by weight of sodium phenolate and separating a pure cyclohexanone by distilling said crude cyclohexanone in at least two stages including a first stage in which impurities having a lower boiling point than the cyclohexanone are distilled off at a pressure of about 400 mm. Hg to 5 atmospheres and a second stage in which the pure cyclohexanone is distilled off from the residue of said first stage at a pressure of about 10 to 200 mm. Hg in the presence of said sodium phenolate.

References Cited by the Examiner

UNITED STATES PATENTS

| | | | |
|---|---|---|---|
| 2,254,615 | 9/1941 | McAllister et al. | 202—57 X |
| 2,377,412 | 6/1945 | Frey | 260—586 |
| 2,429,484 | 10/1947 | Peters | 202—57 |
| 2,737,480 | 3/1956 | Adams et al. | 202—57 X |
| 2,813,905 | 11/1957 | Lyons et al. | 260—586 |
| 2,857,432 | 10/1958 | Joris | 260—486 |
| 3,093,686 | 6/1963 | Simon et al. | 260—586 |
| 3,149,166 | 9/1964 | Poehler et al. | 260—586 |

NORMAN YUDKOFF, *Primary Examiner.*

M. H. SILVERSTEIN, W. L. BASCOMB, *Assistant Examiners.*